(12) United States Patent
Fujikawa et al.

(10) Patent No.: US 9,293,794 B2
(45) Date of Patent: Mar. 22, 2016

(54) BATTERY MODULE

(75) Inventors: Masato Fujikawa, Osaka (JP);
Tomohiko Yokoyama, Osaka (JP);
Keisuke Shimizu, Osaka (JP);
Shunsuke Yasui, Osaka (JP); Daisuke Kishii, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 0 days.

(21) Appl. No.: 13/389,390

(22) PCT Filed: Jun. 22, 2011

(86) PCT No.: PCT/JP2011/003573
§ 371 (c)(1),
(2), (4) Date: Feb. 7, 2012

(87) PCT Pub. No.: WO2012/032697
PCT Pub. Date: Mar. 15, 2012

(65) Prior Publication Data
US 2012/0148895 A1    Jun. 14, 2012

(30) Foreign Application Priority Data

Sep. 9, 2010  (JP) ................. 2010-202016

(51) Int. Cl.
H01M 10/50    (2006.01)
H01M 10/48    (2006.01)
H01M 10/625   (2014.01)
H01M 10/643   (2014.01)
H01M 10/613   (2014.01)

(52) U.S. Cl.
CPC .......... *H01M 10/486* (2013.01); *H01M 10/613* (2015.04); *H01M 10/625* (2015.04); *H01M 10/643* (2015.04)

(58) Field of Classification Search
CPC .......... H01M 10/486; H01M 10/5004; H01M 10/503; H01M 10/5016; Y02E 60/12
USPC .......................................... 429/120
See application file for complete search history.

(56) References Cited

U.S. PATENT DOCUMENTS

| | | | |
|---|---|---|---|
| 7,285,334 B1 * | 10/2007 | Yamashita et al. | 428/458 |
| 7,433,794 B1 | 10/2008 | Berdichevsky et al. | |
| 2005/0130033 A1 * | 6/2005 | Iwamura et al. | 429/159 |
| 2006/0099491 A1 | 5/2006 | Jeon | |
| 2007/0164711 A1 * | 7/2007 | Kim et al. | 320/149 |
| 2008/0292950 A1 * | 11/2008 | Maeda et al. | 429/120 |
| 2011/0005781 A1 * | 1/2011 | Yasui et al. | 169/54 |

FOREIGN PATENT DOCUMENTS

| | | |
|---|---|---|
| CN | 101312240 A | 11/2008 |
| JP | 10-241739 | 9/1998 |
| JP | 2006140150 A | 6/2006 |
| JP | 2008-251263 | 10/2008 |

OTHER PUBLICATIONS

International Search Report issued in International Patent Application No. PCT/JP2011/003573 dated Jun. 22, 2011.
English Translation of the Search Report issued in Chinese Application No. 2011800036328.

* cited by examiner

*Primary Examiner* — Gary Harris
(74) *Attorney, Agent, or Firm* — McDermott Will & Emery LLP

(57) ABSTRACT

A cooling unit 20 is provided in the vicinity of a cell 10, and includes a sealed portion 22 formed by sealing a sheet 21. An easy-to-open portion 24 is provided in part of the sealed portion 22, and the easy-to-open portion 24 is opened when the cell 10 abnormally generates heat.

3 Claims, 7 Drawing Sheets

BATTERY MODULE

RELATED APPLICATIONS

This application is the U.S. National Phase under 35 U.S.C. §371 of International Application No. PCT/JP2011/003573, filed on Jun. 22, 2011, which in turn claims the benefit of Japanese Application No. 2010-202016, filed on Sep. 9, 2010, the disclosures of which Applications are incorporated by reference herein.

TECHNICAL FIELD

The present invention relates to battery modules, particularly to battery modules including a coolant.

BACKGROUND ART

Reusable secondary batteries have been used as power sources of portable electronic devices, mobile telecommunication devices, etc., to save resources and energy. Use of such secondary batteries as power sources of vehicles etc. has been considered to reduce an amount of fossil fuel used, an amount of $CO_2$ emission, etc.

In particular, a technology of connecting general-purpose batteries in parallel or series to constitute battery modules, and combining the battery modules for a wide variety of uses has practically been employed. According to the technology, the battery modules can be downsized and reduced in weight by improving performance of the batteries (cells) constituting the battery modules. This can advantageously improve workability in combining the battery modules, a degree of freedom in mounting the battery modules in limited space in the vehicle, etc.

When the cells are arranged to be close to each other, the battery module can be increased in energy density, and can be downsized. However, if one of the cells experienced an internal short circuit etc., and abnormally generated heat (hereinafter merely referred to as "in the event of abnormal heat generation"), normal cells around the abnormally heated cell (abnormal cell) are exposed to high temperature, and chained abnormal heat generation may possibly occur. Patent Document 1 proposes a cooling tube capable of releasing a coolant in the event of the abnormal heat generation. The cooling tube is configured to partially melt in the event of the abnormal heat generation, and the coolant is released when the cooling tube is molten.

CITATION LIST

Patent Document

[Patent Document 1] U.S. Pat. No. 7,433,794 B1

SUMMARY OF THE INVENTION

Technical Problem

Although the technology of releasing the coolant from the cooling tube in the event of the abnormal heat generation has been proposed, a specific configuration of the cooling unit has not been studied very much so far.

In view of the foregoing, the present invention has been achieved. The present invention is concerned with proposing a highly productive cooling unit capable of releasing a coolant in the event of the abnormal heat generation.

Solution to the Problem

A cooling unit of the present invention is provided in the vicinity of a cell, and includes a sealed portion formed by sealing a sheet. The sealed portion includes an easy-to-open portion which is opened in the event of the abnormal heat generation.

Thus, in the cooling unit of the present invention, the easy-to-open portion is opened first to release a coolant.

The cooling unit of the present invention can be fabricated by sealing the easy-to-open portion and a hard-to-open portion (a portion except for the easy-to-open portion) in different conditions. Thus, the cooling unit of the present invention can relatively easily be fabricated. The conditions for sealing the sheet include not only a sealing pressure and a sealing temperature, but also a material constituting the sealed portion, a shape of the sealed portion, etc.

In this specification, "the vicinity of the cell" is space which is exposed to high temperature (e.g., 150° C. or higher) in the event of the abnormal heat generation, and includes not only space in contact with the abnormal cell, but also space at a small distance from the abnormal cell (e.g., 5 mm or smaller).

In this specification, the "abnormal heat generation" is, for example, generation of heat by the cell when a material constituting the cell is reacted due to an internal short circuit or a short circuit. Thus, the "abnormal heat generation" in the specification does not include generation of heat by the cell in usual charge/discharge. When the cell abnormally generates heat, the temperature of the cell exceeds 150° C., and may exceed 500° C. in some cases.

Advantages of The Invention

The present invention can improve productivity of the cooling unit capable of releasing the coolant in the event of the abnormal heat generation.

DESCRIPTION OF EMBODIMENTS

Figure 1:
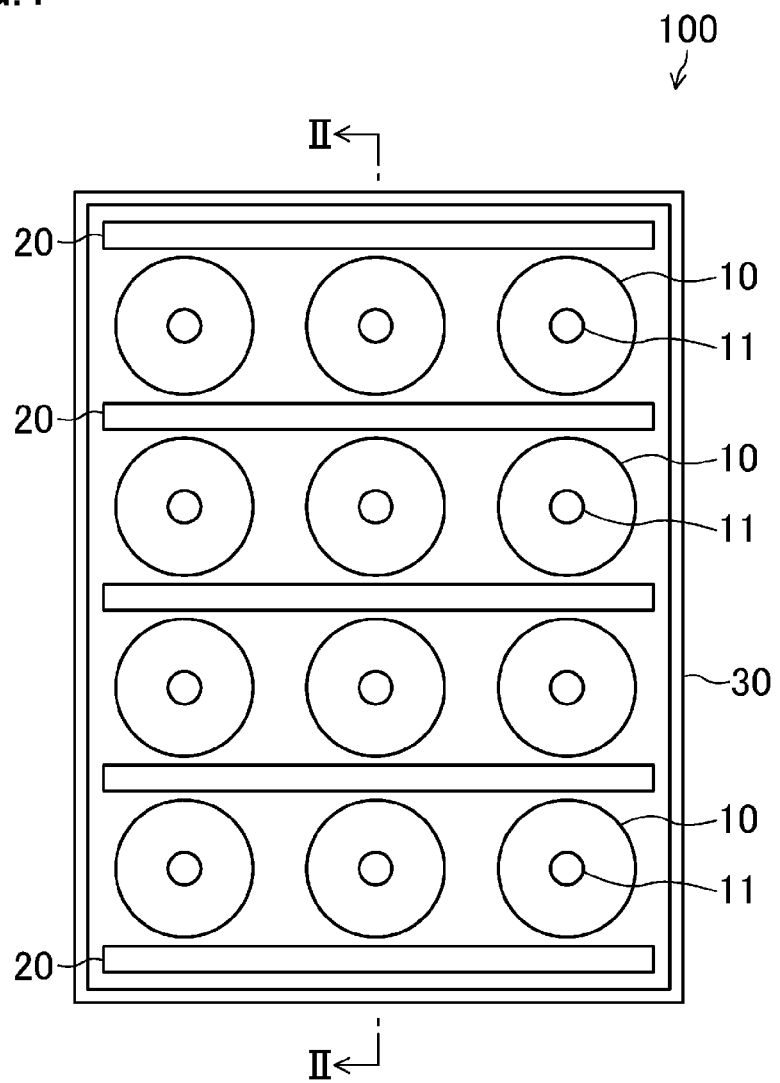
FIG. 1 is a plan view illustrating a battery module according to an embodiment of the present invention.

Embodiments of the present invention will be described with reference to the drawings. The invention is not limited to the following embodiment. The same reference characters indicate the same components.

(Embodiment)

Figure 2:
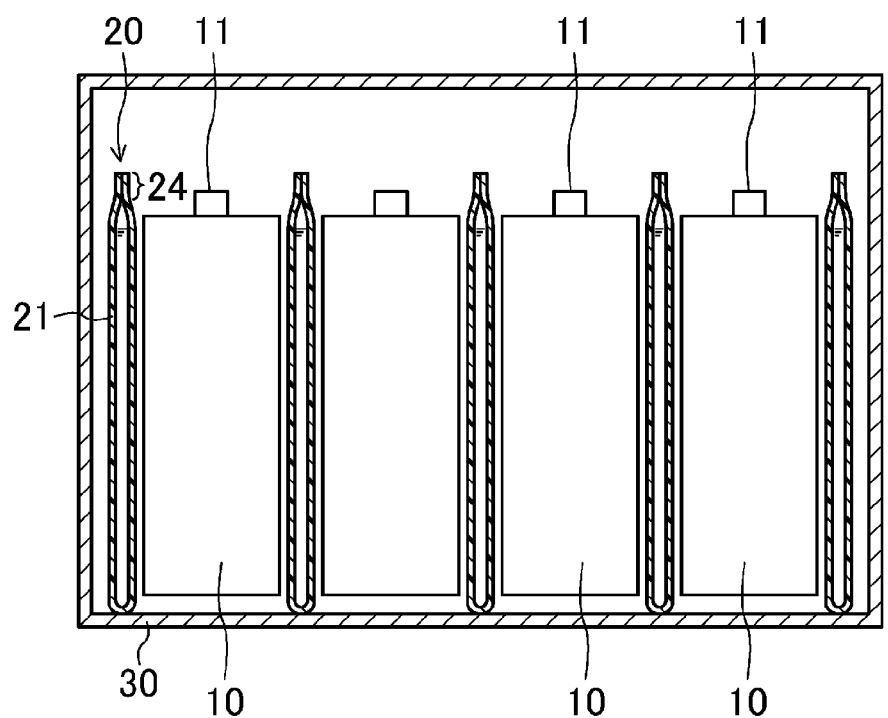
FIG. 2 is a cross-sectional view taken along the line II-II shown in FIG. 1.
Figure 3:
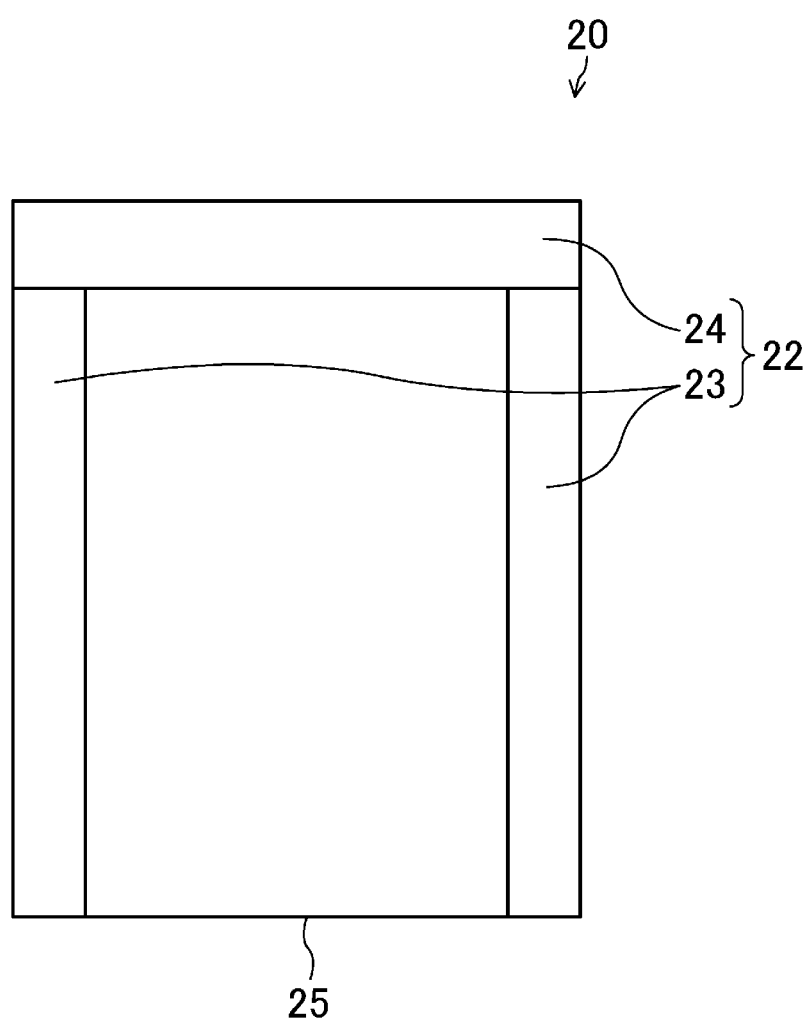
FIG. 3 is a plan view illustrating a cooling unit according to the embodiment of the present invention.

FIG. 1 is a plan view illustrating a battery module 100 according to an embodiment of the present invention. FIG. 2 is a cross-sectional view taken along the line II-II shown in FIG. 1. FIG. 3 is a plan view illustrating a cooling unit 20 according to the present embodiment. In FIG. 2, cells 10 are shown in a side view.

The battery module 100 of the present embodiment includes a plurality of cells 10, 10, . . . arranged in a matrix pattern. The cells 10 are cylindrical lithium ion secondary batteries, for example, and sealing plates 11, 11, . . . are placed in a case 30 to be located in an upper portion of the battery module 100. Thus, in the present embodiment, an axial direction of the cells 10 is substantially parallel to a direction of height of the case 30.

Cooling units 20 are arranged between the cells 10, 10 adjacent to each other. The cooling unit 20 is formed by folding a sheet 21 which is in the shape of a square, or a rectangle when viewed in plan, and rims of overlapping parts of the folded sheet are sealed. Specifically, a sealed portion 22 extending along three sides of the cooling unit 20 of the present embodiment is formed. A coolant, such as water etc., is contained in sealed space in the folded sheet.

The sheet 21 is a laminated film, for example, and includes a fusion layer, a base layer, and an insulating layer stacked in a direction from the inside to the outside of the cooling unit 20. The fusion layer, the base layer, and the insulating layer may have thicknesses of about 40 μm, 50 μm, and 30 μm, respectively. The base layer may be made of aluminum or stainless steel, and the insulating layer may be made of nylon or polyethylene terephthalate. In the sealed portion 22, parts of the fusion layer overlapping each other when the sheet is folded are fused.

The sealed portion 22 includes a hard-to-open portion 23 which is relatively hard to open in the event of abnormal heat generation, and an easy-to-open portion 24 which is relatively easy to open in the event of the abnormal heat generation. Thus, in the event of the abnormal heat generation, the cooling unit 20 is opened first at the easy-to-open portion 24, and the coolant is released through the easy-to-open portion 24. Since the cooling unit 20 is provided between the cells 10 adjacent to each other, the coolant released through the easy-to-open portion 24 is fed to an abnormal cell 10, thereby cooling the abnormal cell 10. This can prevent exposure of the other normal cells 10 to high temperature, and can prevent chained abnormal heat generation.

When the cell 10 abnormally generates heat, the cooling unit 20 is opened at the easy-to-open portion 24, and releases the coolant. Thus, the battery module 100 no longer requires a temperature sensor for sensing the temperature of the cell 10, a mechanism for opening the cooling unit 20, a control mechanism for driving the opening mechanism based on the temperature sensed by the temperature sensor, etc. This can downsize the battery module 100, and can increase energy density of the battery module 100.

In addition, since the easy-to-open portion 24 is provided in part of the sealed portion 22, the cooling unit 20 can be fabricated by merely sealing the easy-to-open portion 24 and the hard-to-open portion 23 in different conditions. Thus, the cooling unit 20 can relatively easily be fabricated, and productivity of the cooling unit 20 can be improved. The easy-to-open portion 24 will be described in detail below.

For example, a melting point of the fusion layer in the easy-to-open portion 24 may be lower than a melting point of the fusion layer in the hard-to-open portion 23. In the event of the abnormal heat generation, heat is released from the abnormal cell 10, and the temperature of the cooling unit 20 in the vicinity of the abnormal cell 20 increases. When the temperature of the cooling unit 20 exceeds the melting point of the fusion layer in the easy-to-open portion 24, the fusion layer in the easy-to-open portion 24 is molten.

Further, a fusion strength of the fusion layer in the easy-to-open portion 24 may be lower than a fusion strength of the fusion layer in the hard-to-open portion 23. In the event of the abnormal heat generation, the temperature of the cooling unit 20 in the vicinity of the abnormal cell 10 increases as described above. The increase in temperature of the cooling unit 20 increases the temperature of the coolant, thereby increasing a vapor pressure of the coolant, and increasing a pressure in the cooling unit 20. When the pressure in the cooling unit 20 exceeds the fusion strength of the fusion layer in the easy-to-open portion 24, the fusion layer in the easy-to-open portion 24 is no longer fused.

The melting point of the fusion layer in the easy-to-open portion 24 may relatively be low, and the fusion strength of the fusion layer in the easy-to-open portion 24 may relatively be low.

The lower the melting point of the fusion layer in the easy-to-open portion 24 is, or the lower the fusion strength of the fusion layer in the easy-to-open portion 24 is, the cooling unit 20 is opened earlier in the event of the abnormal heat generation, thereby quickly cooling the abnormal cell 10. However, when the melting point of the fusion layer in the easy-to-open portion 24 is too low, or when the fusion strength of the fusion layer in the easy-to-open portion 24 is too low, the cooling unit 20 may erroneously be opened. In view of the foregoing, the melting point or the fusion strength of the fusion layer in the easy-to-open portion 24 may be determined.

To make the melting point of the fusion layer in the easy-to-open portion 24 relatively low, the fusion layer in the easy-to-open portion 24 can be made of a material having a lower melting point than the fusion layer in the hard-to-open portion 23. For example, the fusion layer in the easy-to-open portion 24 may be made of a polyethylene resin layer, and the fusion layer in the hard-to-open portion 23 may be made of a polypropylene resin layer. Alternatively, the fusion layer in the easy-to-open portion 24 may be made of a polyethylene resin layer having a low molecular weight, and the fusion layer in the hard-to-open portion 23 may be made of a polyethylene resin layer having a high molecular weight.

To make the fusion strength of the fusion layer in the easy-to-open portion 24 relatively low, at least one of the following methods (a)-(d) can be selected.

(a): The fusion layer in the easy-to-open portion 24 may relatively be thinned. For example, a thickness of the fusion layer in the easy-to-open portion 24 may be 30% to 80%, both inclusive, of a thickness of the fusion layer in the hard-to-open portion 23.

(b): A fusion pressure in forming the easy-to-open portion 24 may relatively be reduced. For example, a fusion pressure in forming the easy-to-open portion 24 may be 40% to 80%, both inclusive, of a fusion pressure in forming the hard-to-open portion 23.

(c): A fusion temperature in forming the easy-to-open portion 24 may relatively be reduced. For example, a difference between the fusion temperature in forming the easy-to-open portion 24 and the fusion temperature in forming the hard-to-open portion 23 may be 10° C. to 30° C., both inclusive.

(d): A width of the fusion layer in the easy-to-open portion 24 may relatively be reduced. For example, the width of the fusion layer in the easy-to-open portion 24 may be 10% to 50%, both inclusive, of the width of the fusion layer in the hard-to-open portion 23.

In the event of the abnormal heat generation, the temperature of the cooling unit 20 is increased by the heat of the abnormal cell 10, and the easy-to-open portion 24 is opened.

Figure 4:
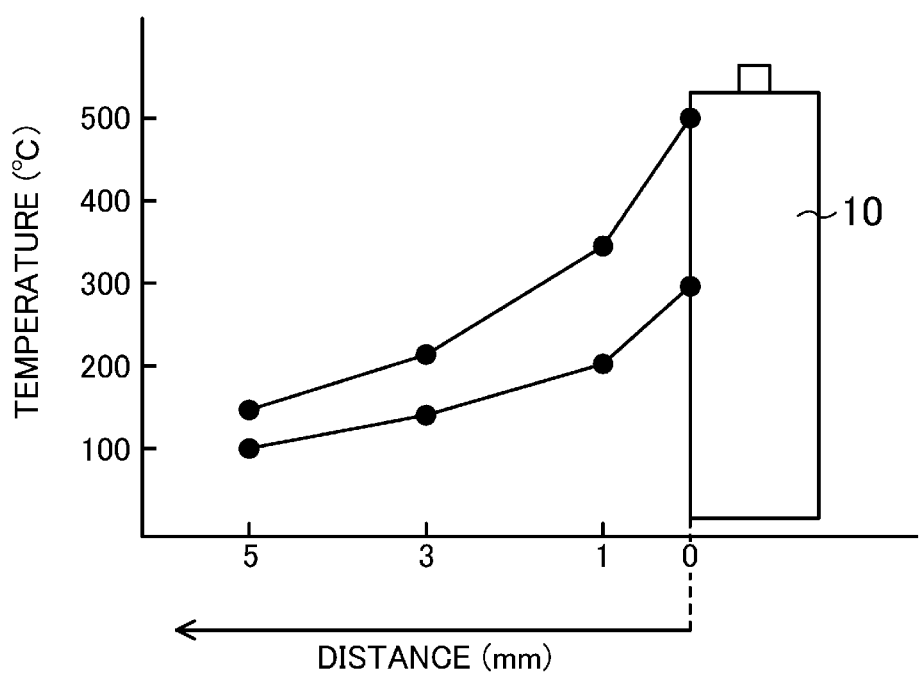
FIG. 4 is a graph showing a relationship between distance from an outer surface of a cell and temperature in the event of abnormal heat generation.

When the cooling unit 20 is in contact with an outer surface of the cell 10, the heat of the abnormal cell 10 is quickly transferred to the cooling unit 20 in the event of the abnormal heat generation, and the cooling unit 20 can be opened in an early stage. To prevent chained abnormal heat generation, the cooling unit 20 is preferably in contact with the outer surface of the cell 10, and more preferably, the easy-to-open portion 24 is in contact with the outer surface of the cell 10. However, the shape or size of the cooling unit 20 may be limited by bringing the cooling unit 20 into contact with the outer surface of the cell 10. Thus, the inventors of the present application have studied a relationship between a distance from the outer surface of the cell 10 to the cooling unit 20 (hereinafter merely referred to as a "distance") and temperature in the event of abnormal heat generation. Specifically, an air layer is present on the outer surface of the cell 10 (i.e., the distance is a thickness of the air layer). Thus, the relationship between the distance and the temperature is calculated based on thermal conductivity of the air. FIG. 4 shows the results.

As shown in FIG. 4, the temperature is about 150° C. when the distance is about 3 mm. When the temperature of the abnormal cell 10 is high, the temperature exceeds 150° C. even when the distance is about 5 mm. This indicates that the cooling unit 20 can be opened at the easy-to-open portion 24 in the event of the abnormal heat generation when the distance is 5 mm or smaller. Thus, the cooling unit 20 which can prevent the chained abnormal heat generation can be fabricated without limitation to the shape and size thereof.

When the type of the cell 10 changes (e.g., when the components of the cell 10 change), or the surroundings of the battery module change, the plot on the graph in FIG. 4 changes. However, in either case, the chained abnormal heat generation can be prevented even when the easy-to-open portion 24 or the cooling unit 20 is not in contact with the outer surface of the cell 10.

The easy-to-open portion 24 will be described in further detail below. The easy-to-open portion 24 may be located in an upper part of the battery module 100 (FIG. 2), or may be located in a lower part of the battery module 100. However, when the battery module 100 is incorporated in a vehicle (when the battery module 100 is in use), and the easy-to-open portion 24 is located above the center of gravity of the cell 10, the coolant is fed to the abnormal cell 10 from above in the event of abnormal heat generation, thereby increasing a surface area of the cell 10 in contact with the coolant. Thus, the abnormal cell 10 can effectively be cooled as compared with the case where the easy-to-open portion 24 is located below the center of gravity of the cell 10. Therefore, the easy-to-open portion 24 is preferably located above the center of gravity of the cell 10 when the battery module 100 is in use. When the battery module 100 is in use as shown in FIG. 2, the easy-to-open portion 24 is preferably located near the sealing plate 11 of the cell 10.

The easy-to-open portion 24 may be arranged opposite a bent portion 25 (FIG. 3), or may be arranged at a position of the hard-to-open portion 23 shown in FIG. 3. However, when the easy-to-open portion 24 is located in an upper part of the battery module 100, the above-described advantage (the surface area of the cell 11 in contact with the coolant increases in the event of the abnormal heat generation increases) can be obtained. When the cooling unit 20 is placed in the case 30 with the bent portion 25 located below, an area of contact between the cooling unit 20 and the case 30 can be increased, and the cooling unit 20 can stably be placed in the case 30. In view of these points, the easy-to-open portion 24 is preferably arranged opposite the bent portion 25.

The easy-to-open portion 24 may be arranged in part of one of sides of the cooling unit 20, or two or more easy-to-open portions 24 may be provided in a single cooling unit 20. The position and size of the easy-to-open portion 24 in the cooling unit 20 may be determined in such a manner that the cooling unit can easily be fabricated, the cooling unit 20 can easily be opened in the event of the abnormal heat generation, and the cooling unit 20 is not erroneously opened.

(Alternative)

This alternative is different from the above embodiment in arrangement of the cells in the battery module, and structure of the cooling unit. The differences between the alternative and the above embodiment will be described below.

Figure 5:
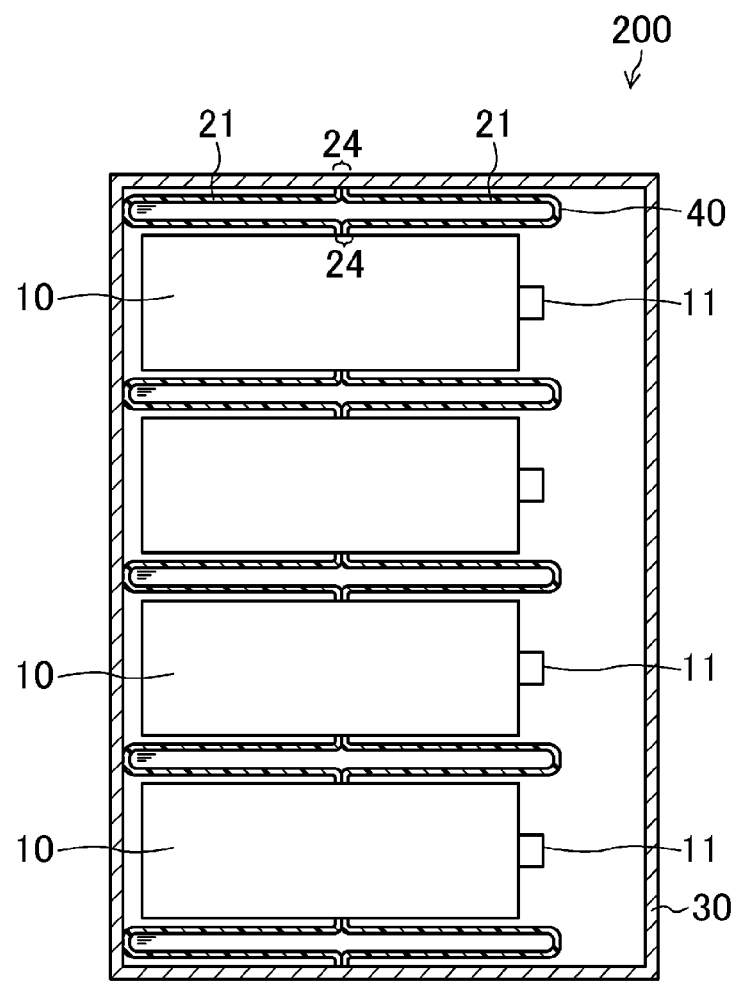
FIG. 5 is a cross-sectional view illustrating a battery module according to another embodiment of the present invention.
Figure 6:
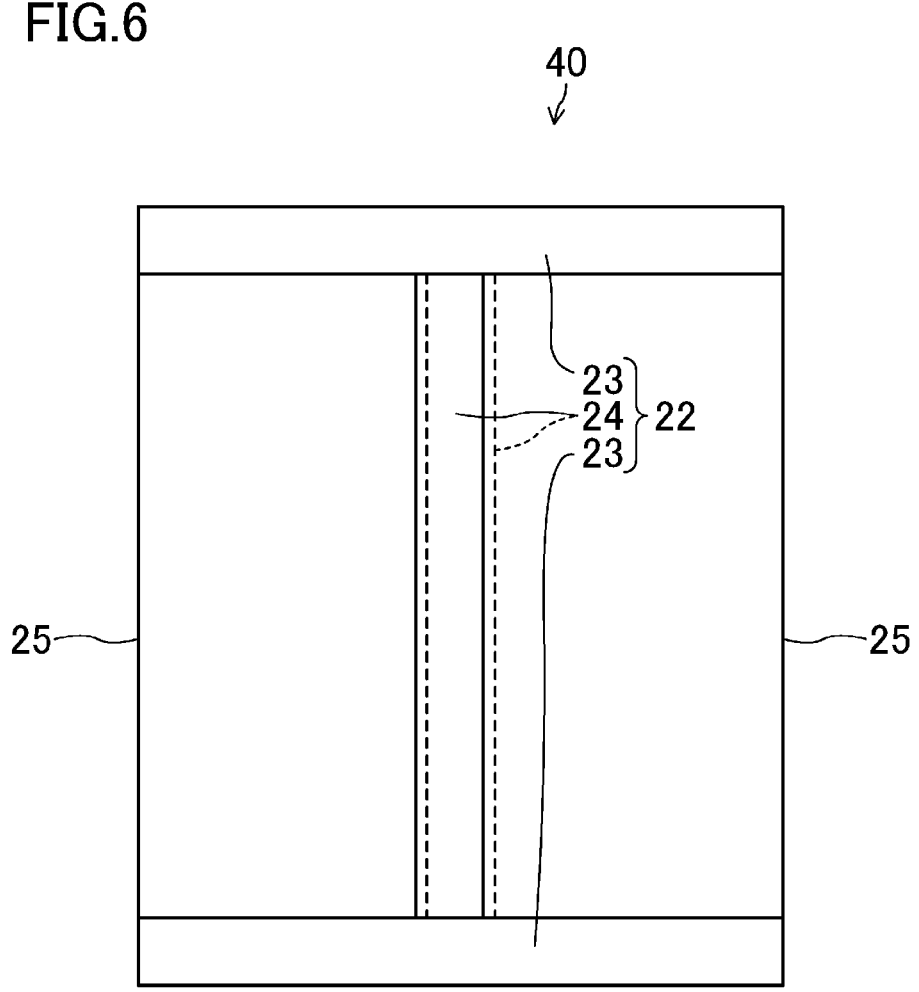
FIG. 6 is a plan view illustrating a cooling unit according to another embodiment of the present invention.

FIG. 5 is a cross-sectional view illustrating a battery module 200 of this alternative. FIG. 6 is a plan view illustrating a cooling unit 40 of this alternative. In FIG. 5, the cells 10 are shown in a side view.

In the battery module 200 of this alternative, the cells 10, 10, . . . are arranged in a horizontal and vertical directions, and are placed in the case 30 with the sealing plates 11, 11, . . . located along the side of the battery module 200. Thus, in this alternative, an axial direction of the cells 10 is perpendicular to a direction of height of a case 30.

Cooling units 40 are arranged between the cells 10, 10 adjacent to each other. The cooling unit 40 is formed of two sheets 21, 21, and is in the shape of a square or a rectangle when viewed in plan. Specifically, longitudinal ends of the sheets 21, 21 are fused to form a tubular member, and open ends of the tubular member are fused. Thus, the cooling unit 40 of this alternative is formed. The cooling unit 40 of this alternative has four sealed portions 22. Two of the four sealed portions 22 are located at edges of the cooling unit 40, and face each other. The other two sealed portions 22 connect the two sealed portions 22 at the edges of the cooling unit 40, and face each other.

The sealed portion 22 includes a hard-to-open portion 23, and an easy-to-open portion 24. The easy-to-open portion 24 is configured in the same manner as described in the above embodiment. Also in this alternative, the easy-to-open portion 24 is opened when the temperature of the cooling unit 40 is increased by heat from the abnormal cell 10. Thus, as described in the above embodiment, the cooling unit 40 (particularly the easy-to-open portion 24) may be in contact with the outer surface of the cell 10 as shown in FIG. 5, or may slightly be separated from the outer surface of the cell 10 (within a distance of 5 mm or smaller).

In FIG. 6, the hard-to-open portion 23 is provided in the sealed portion 22 at the edges of the cooling unit 40, and the easy-to-open portion 24 is provided in the sealed portion 22 connecting the two hard-to-open portions 23. The position and size of the easy-to-open portion 24 in the cooling unit 40 are not limited to the example shown in FIG. 6, and the easy-to-open portion 24 may be arranged at the position of the hard-to-open portion 23 shown in FIG. 6. However, when the easy-to-open portion 24 is arranged at the position of the hard-to-open portion 23 shown in FIG. 6, the easy-to-open portion 24 is located axially outward, or radially outward relative to the cell 10 in the battery module 200. Thus, most of the coolant may fall without being fed to the abnormal cell 10 in the event of abnormal heat generation. When the easy-to-open portion 24 is arranged as shown in FIG. 6, the easy-to-open portion 24 is located axially inward relative to the cell 10 in the battery module 200. Thus, the coolant is fed to almost every part of the abnormal cell 10 in the event of the abnormal heat generation. Therefore, in this alternative, the easy-to-open portion 24 is preferably arranged as shown in FIG. 6.

When the easy-to-open portion 24 is arranged as shown in FIG. 6, the cooling unit 40 may be placed in the case 30 in such a manner that the easy-to-open portion 24 extends in the axial direction of the cell 10. Also in this case, the coolant can be fed to almost every part of the abnormal cell 10 in the event of the abnormal heat generation.

The easy-to-open portion 24 may be provided intermittently between the two hard-to-open portions 23, 23 (may be provided partially in the vertical direction in FIG. 6), or may be provided in one of the sealed portions 22 connecting the two hard-to-open portions 23, 23 (preferably, the sealed portion 22 located in a lower part of the battery module 200). The position and size of the easy-to-open portion 24 may be determined in such a manner that the cooling unit 40 can easily be fabricated, the cooling unit 40 can easily be opened in the event of the abnormal heat generation, and the cooling unit 40 is not erroneously opened.

In the alternative described above, like the above embodiment, the easy-to-open portion 24 is provided in part of the sealed portion 22. Thus, the alternative can provide advantages similar to those of the above embodiment.

(Other Embodiments)

The embodiment and the alternative may be modified in the following manner.

The battery module of the embodiment may include the cooling unit of the alternative. However, the cooling unit of the embodiment can be fabricated more easily. Thus, the battery module of the embodiment may preferably include the cooling unit of the embodiment.

The battery module of the alternative may include the cooling unit of the embodiment. In this case, however, the cooling unit cannot easily be arranged in such a manner that the easy-to-open portion is located radially inward relative to the cell, or the easy-to-open portion extends in the axial direction of the cell. Thus, the battery module of the alternative may preferably include the cooling unit of the alternative.

The cooling unit is not limited to the cooling units 20, 40 as long as the cooling unit includes the sealed portion 22 and the easy-to-open portion 24.

Figure 7:
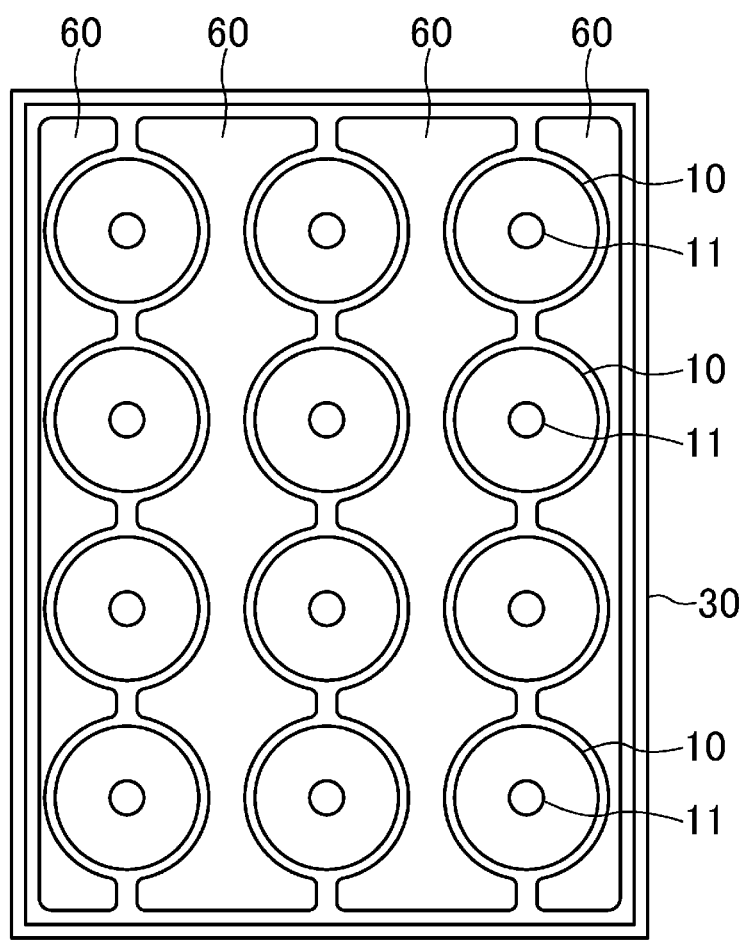
FIG. 7 is a plan view illustrating a battery module according to still another embodiment of the present invention.

The shape of the cooling unit is not limited to the examples shown in FIGS. 1, 2, and 5. For example, the cooling unit may be formed to surround an outer peripheral surface of the cell as shown in FIG. 7. A cooling unit 60 shown in FIG. 7 can contain a larger amount of the coolant than the cooling units 20, 40, and the amount of the coolant fed to the abnormal cell 10 in the event of the abnormal heat generation can be increased. Thus, the abnormal cell 10 can be cooled more effectively as compared with the case where the cooling unit 20, 40 is used. The planar shape of the cooling unit is not limited to the square-shape, or the rectangular-shape.

The cooling unit may be provided near the sealing plate of the cell, or may be provided near the bottom of the battery case of the cell. In either case, the easy-to-open portion is opened in the event of the abnormal heat generation. When the cooling unit is provided between the cells adjacent to each other, the position of the easy-to-open portion in the cooling unit can easily be determined. This can improve productivity of the cooling unit. Further, the coolant can be fed to the abnormal cell in the event of the abnormal heat generation without wasting the coolant, thereby efficiently cooling the abnormal cell. Thus, the cooling unit is preferably provided between the cells adjacent to each other as shown in FIGS. 1, 2, 5, and 7. In the embodiment described above, the cooling unit may be provided between the cells adjacent to each other in at least one of a line direction or a column direction of the battery module. In the alternative described above, the cooling unit may be provided between the cells adjacent to each other in at least one of a line direction or a depth direction of the battery module.

A single cooling unit may be provided for a plurality of cells, or a single cooling unit may be provided for a single cell. However, in view of productivity of the cooling unit, the single cooling unit is preferably provided for the plurality of cells as shown in FIG. 1 or 7.

The number of the sheets constituting the cooling unit is not limited to the examples described above. However, when the number of the sheets increases, the productivity of the cooling unit may decrease, and a probability of erroneous opening of the cooling unit may increase. The number of the sheets may be determined in view of such problems.

The sheet is not limited to the laminate film, and may be a single layer film of resin. The base layer of the laminate film may be made of resin, and the laminate film may not have the insulating layer. The thicknesses of the fusion layer, the base layer, and the insulating layer constituting the laminate film are not limited to the examples described above.

The coolant is not limited to water. However, water has high heat of vaporization. Thus, the abnormal cell can efficiently be cooled by using water as the coolant. The coolant may be a liquid prepared by mixing water with ethylene glycol, propylene glycol, or glycerin. This can prevent the coolant from freezing in a low temperature condition, and the coolant can be used in the low temperature condition (e.g., in a cold district). The coolant may be a liquid prepared by mixing water with a thickener, such as gelatin, etc. This increases viscosity of the coolant, and increases time for which the coolant is in contact with the abnormal cell, thereby efficiently cooling the abnormal cell.

When the easy-to-open portion is located above the center of gravity of the cell when the battery module is in use, the battery module is preferably provided with a mark indicating the top and the bottom of the battery module. This can prevent users from mounting the battery module in a device, such as a vehicle etc., upside down. Thus, the coolant can be fed to almost every part of the abnormal cell in the event of the abnormal heat generation, thereby efficiently cooling the abnormal cell.

The cells may be connected in series or parallel, and the battery module preferably includes a connector for connecting the cells in series or parallel. The battery module may be provided with an exhaust duct communicating with vents of the cells.

The number of the cells constituting the battery module is not limited to the examples shown in FIG. 1, 5, or 7. The cells may be arranged in line in the battery module.

The cells may be rectangular lithium ion secondary batteries, laminated batteries, or secondary batteries except for lithium ion secondary batteries. The structure of the cell is not particularly limited as long as it is well known structure of the secondary battery. When the cell is a cylindrical lithium ion secondary battery, an electrode group formed by winding a positive electrode and a negative electrode with a separator interposed therebetween may be placed in a battery case with an electrolytic solution.

The case of the battery module may include, for example, a casing having a container part, and a lid.

INDUSTRIAL APPLICABILITY

The battery module of the present invention is useful as power supplies of portable electronic devices, mobile telecommunication devices, vehicles, etc.

DESCRIPTION OF REFERENCE CHARACTERS

10 Cell
11 Sealing plate
20, 40, 60 Cooling unit
21 Sheet
22 Sealed portion
24 Easy-to-open portion
100, 200 Battery module.

The invention claimed is:

1. A battery module comprising an arrangement of plurality of cells, wherein
a cooling unit containing a coolant is provided in the vicinity of the cells,
the cooling unit includes a sealed portion formed by sealing a sheet made of a laminated film including a stack of a fusion layer, a base layer and an insulating layer,
an easy-to-open portion which is relatively easy to open when the cell abnormally generates heat and a hard-to-open portion which is relatively hard to open when the cell abnormally generates heat are provided in parts of the sealed portion,
the sealed portion is formed by fusing the fusion layer in the sheet,
a thickness of the fusion layer in the easy-to-open portion is not lower than 30% and not higher than 80% of a thickness of the fusion layer in the hard-to-open portion, and
a fusion strength of the fusion layer in the easy-to-open portion is lower than a fusion strength of the fusion layer in the hard-to-open portion.

2. The battery module of claim 1, wherein a fusion pressure in forming the easy-to-open portion is greater than or equal to 40% of a fusion pressure in forming the hard-to-open portion and less than or equal to 80% thereof.

3. The battery module of claim 1, wherein a width of the fusion layer in the easy-to-open portion is greater than or equal to 10% of a width of the fusion layer in the hard-to-open portion and less than or equal to 50% thereof.

* * * * *